United States Patent
Emmert et al.

(10) Patent No.: US 11,297,143 B2
(45) Date of Patent: Apr. 5, 2022

(54) OPERATIONAL PARAMETER RECORDING DEVICE COMPRISING AT LEAST A SENSOR AFFIXED TO A COMPONENT AND CORRESPONDING PROCESS

(71) Applicant: Aktiebolaget SKF, Gothenburg (SE)

(72) Inventors: Michael Emmert, Willmars (DE); Sebastian Ziegler, Bamberg (DE)

(73) Assignee: Aktiebolaget SKF, Göeborg (SE)

(*) Notice: Subject to any disclaimer, the term of this patent is extended or adjusted under 35 U.S.C. 154(b) by 0 days.

(21) Appl. No.: 17/029,140

(22) Filed: Sep. 23, 2020

(65) Prior Publication Data
US 2021/0120087 A1   Apr. 22, 2021

(30) Foreign Application Priority Data
Oct. 22, 2019 (DE) .......................... 102019216258.4

(51) Int. Cl.
*H04L 29/08* (2006.01)
*H04L 67/12* (2022.01)

(52) U.S. Cl.
CPC .................................. *H04L 67/12* (2013.01)

(58) Field of Classification Search
CPC ..................................................... H04L 67/12
See application file for complete search history.

(56) References Cited

U.S. PATENT DOCUMENTS

| 10,555,058 B2* | 2/2020 | Pinkerton | ................ H04Q 9/00 |
| 2011/0240747 A1 | 10/2011 | Stewart | |
| 2016/0236522 A1* | 8/2016 | Taki | .................... B60C 23/0415 |
| 2017/0219279 A1* | 8/2017 | Chae | ..................... G01K 1/024 |

FOREIGN PATENT DOCUMENTS

| DE | 3028808 A1 | 3/1982 |
| DE | 3936542 C1 | 4/1991 |
| DE | 102013203832 A1 | 9/2014 |
| DE | 102017200483 A1 | 7/2018 |
| DE | 102018216487 A1 | 3/2020 |
| WO | 2010082945 A1 | 7/2010 |

OTHER PUBLICATIONS ttps://www.elektronikpraxis.vogel.de/erstes-batterieloses-bluetooth-sensor-tag-fuer-iot-anwendungen-a-793715/ Jan. 28, 2019.

* cited by examiner

*Primary Examiner* — Kim T Nguyen
(74) *Attorney, Agent, or Firm* — Garcia-Zamor Intellectual Property Law; Ruy Garcia-Zamor; Bryan Peckjian

(57) ABSTRACT

Operational parameter recording device providing a sensor affixed to a component, a central control unit and a remote server connected to the central control unit. Each sensor provides a measurement device, at least a power source, a communication device, a memory and processing device, the measurement device being configured to determine at least an operational parameter. Also a process for carrying out the function of the operational parameter recording device.

10 Claims, 1 Drawing Sheet

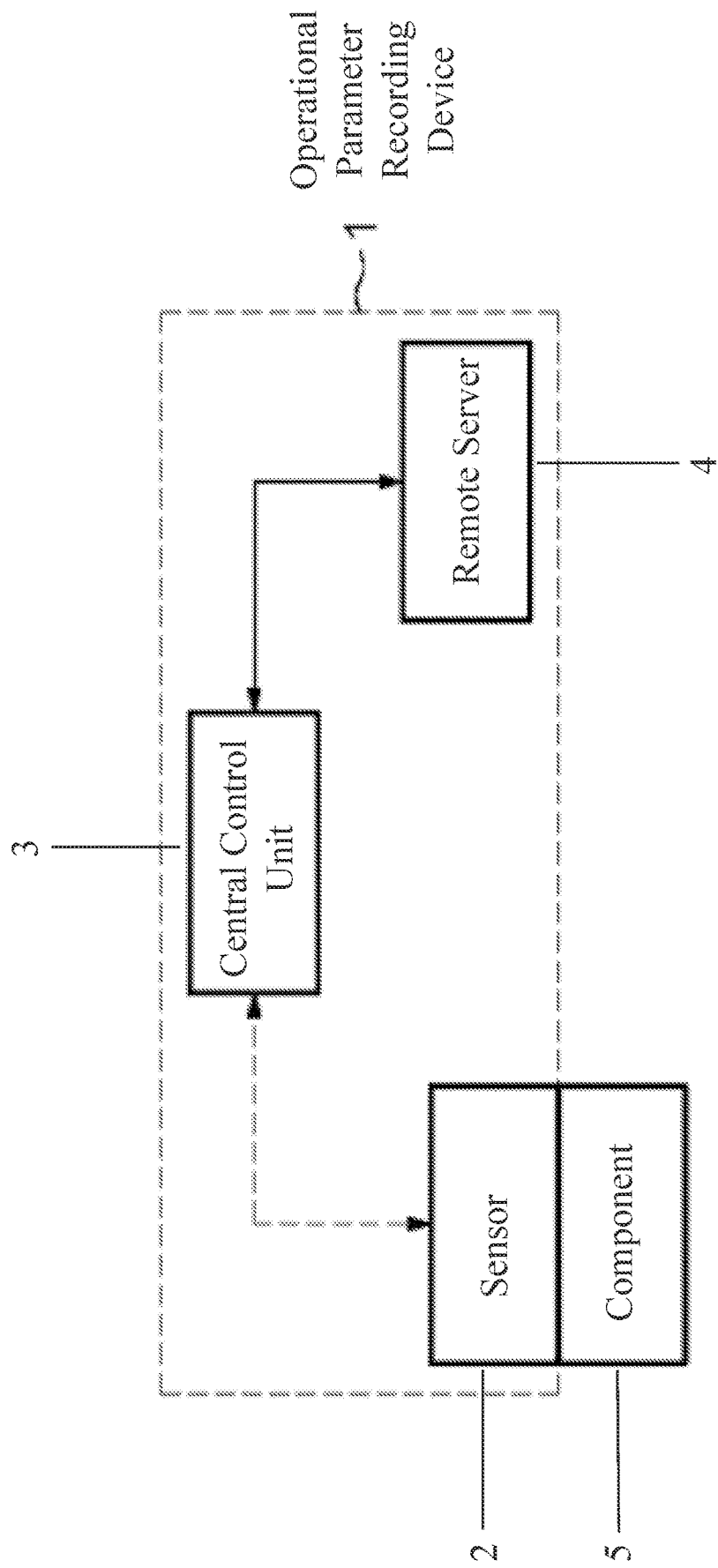

OPERATIONAL PARAMETER RECORDING DEVICE COMPRISING AT LEAST A SENSOR AFFIXED TO A COMPONENT AND CORRESPONDING PROCESS

CROSS-REFERENCE TO RELATED APPLICATIONS

This application claims priority to German Patent Application no. 102019216258.4, filed Oct. 22, 2019, the contents of which is fully incorporated herein by reference.

TECHNICAL FIELD OF THE INVENTION

The present invention relates to devices for determining operational parameters of a machine or system.

BACKGROUND OF THE INVENTION

Most complex systems comprise a large number of components which can require servicing at different times depending of their respective MTBF (acronym for "mean time before failure").

In order to have a complete picture of the system and of its servicing, recording of the replacement of each component of a system is required. Such a recording comprises an identification of the replacement component, like a part number or a serial number, along with the time of operation start-up.

The identification of the replacement component is usually achieved thanks to a QR code or a number on each component, either etched or embossed.

So far, it had not been possible to record the precise time of the operation start-up for each component of a complex system. Moreover, keeping track of servicing requires input from a servicing operative, which is prone to errors.

Therefore, there is a need for a recording device configured to track time of operation start-up for each component along with an history of its replacements.

SUMMARY OF THE INVENTION

An object of the invention is an operational parameter recording device comprising at least a sensor affixed to a component, a central control unit and a remote server connected to the central control unit, each sensor comprises measurement means, at least a power source, communication means, a memory and processing means, the measurement means being configured to determine at least an operational parameter, the memory comprising at least a sensor identifier, the processing means commanding the communication means for transmitting the sensor identifier to the central control unit, the start-up time of the component is either determined within the sensor processing means and transmitted to the central control unit along with the sensor identifier or is determined within central control unit processing means, the start-up time determination being based on at least one of the operational parameter measured and at least a predetermined threshold value for the at least one operational parameter measured, the central control unit memorizes, for each sensor identifier, the start-up time along with the sensor identifier in a data table, the central control unit then determines the operating duration for each component as a function of the recorded start-up time for each sensor identifier and the pairing data recorded on the remote server linking a sensor identifier to a component identifier identifying the component the sensor is affixed to.

At least one operational parameter measured can be transmitted to the central control unit along with the sensor identifier.

An operational parameter can be chosen among position, speed, acceleration, angle, rotational speed, rotational acceleration, direction of rotation, elongation, temperature, presence of a chemical compound, resistance, current, voltage or magnetic field.

The component can be either a part of a system, a complete system, or a device comprising a plurality of systems.

The component identifier and the sensor identifier can be read and recorded as being paired on the remote server, The component identifier can be retrieved from the component casing or surface through optical reading.

The component identifier can be retrieved directly from the memory of the laser engraver set or having being set to etch the component identifier on the component surface.

The sensor identifier can be retrieved from the sensor casing through optical reading.

The sensor identifier can be retrieved from the memory of the sensor.

During servicing of the component, the component identifier of a replacement component and the sensor identifier of a sensor affixed to the replacement component can be recorded as replacing the previous component identifier and sensor identifier.

The sensor can be essentially flat, like a sensor tag.

The sensor power source can be omnipresent power harvesting means.

The component can be a bearing.

Another object of the invention is an operational parameter recording process for recording at least an operational parameter of a component through an operational parameter recording device as described above.

The process comprises the following steps:
determining at least an operational parameter,
determining the start-up time of the component based on the at least one operational parameter measured and at least a predetermined threshold value for the at least one operational parameter measured, memorizing the component start-up time in a data table along with the sensor identifier stored within the memory of the sensor, for each sensor identifier, and
determining the operating duration for each component as a function of the recorded start-up time for each sensor identifier and the pairing data recorded on the remote server linking a sensor identifier to a component identifier identifying the component the sensor is affixed to.

Data pairing stored on the remote server can be determined by:
reading both the component identifier and the sensor identifier, during manufacturing or servicing, and
recorded both the component identifier and the sensor identifier as being paired on the remote server.

Another object of the invention is a bearing comprising at least one of the following elements: an inner ring, an outer ring, at least one row of rolling elements, at least one cage for maintaining the circumferential spacing of the rolling elements, the bearing further comprises an operational parameter recording device as described above and affixed to one of the rings, rolling elements, or cage(s).

The operational parameter recording device and process present the following advantages:

It is possible to determine thanks to identifiers; which components are integrated in a system.

It is possible to identify the time of operation start-up in the event of warranty agreements and warranty claims, and to track servicing.

It allows invoicing based on data provided by the component(s) in a "performance based" framework.

BRIEF DESCRIPTION OF THE FIGURES

The present invention will be better understood from studying the detailed description of a number of embodiments considered by way of entirely non-limiting examples and illustrated by the attached drawing in which the only FIGURE shows the main components of an operational parameter recording device according to the invention.

FIG. 1 shows an operational parameter recording device according to the present invention.

DETAILED DESCRIPTION OF THE INVENTION

The FIGURE shows an operational parameter recording device 1 according to the invention comprising at least a sensor 2, a central control unit 3 and a remote server 4.

Each sensor 2 is integrated in/at a component 5 during production of the component.

Each component 5 comprises a component identifier, notably a serial number or QR code according to the state of the art, printed or engraved on the component 5 casing.

Each sensor 2 comprises a sensor identifier, notably a coded serial number, stored in memory, and, optionally either printed or engraved on the component 5 casing. Each sensor 2 transmits the sensor identifier stored in memory, when in range of an authenticated reading device or central control unit 3.

During manufacturing of the component 5, the component identifier and the sensor identifier are read and recorded as being paired on a remote server 4.

Optical reading enables retrieving the component identifier from the component casing or surface. Alternatively, the component identifier is retrieved directly from the memory of the laser engraver set or having being set to etch the component identifier on the component 5 casing or surface.

Similarly, optical reading enables retrieving the sensor identifier from the sensor casing. Alternatively, the sensor identifier is read from the memory of the sensor 2 through wireless communication, notably either RFID or NFC. The component identifier and the sensor identifier are then recorded as being paired on a remote server 4.

During servicing, a component 5 is swapped with a replacement component 5. The component identifier of the replacement component 5 is read with an optical scanner. The sensor identifier of the sensor 2 affixed to the replacement component 5 is retrieved either with an optical scanner or from the memory of the sensor 2 through wireless communication, notably either RFID or NFC.

The component identifier and the sensor identifier are then recorded as being paired on a remote server 4. In a particular embodiment, the component identifier and the sensor identifier are also recorded as replacing the previous component identifier and sensor identifier.

To be able to easily retrieve and record the component identifier of the replacement component and the sensor identifier it is paired to, an operative can use a handheld sensor. A handheld sensor can comprise an optical sensor along with processing means, memory and communication means, the communication means being able to establish close proximity communication with the sensor 2, notably either RFID or NFC and communication with a remote server 4.

The handheld sensor enables retrieving both the component identifier and the sensor identifier, pairing them, and uploading the resulting pairing information to the remote server 4. The handheld sensor 2 reduces the risk of operative error since it can simultaneously record the sensor identifier and the component identifier, in particular when retrieving the sensor identifier thanks to close range wireless communication with the sensor 2 and optical reading of the component identifier.

Once pairing data is determined, the operational parameter recording device can proceed with recording at least one operational parameter of the component 5.

As mentioned above, the operational parameter recording device according to the invention comprises at least a sensor 2 affixed to a component 5 to monitor, a central control unit 3 wirelessly connected to each sensor 2 and a remote server 4 connected to the central control unit 3. A component 5 can be a part of a system, a system or a device comprising several systems In a particular embodiment, the sensor 2 is affixed to a bearing, wherein it can be integrated either in a cavity at the bearing rings or bearing face, in/at the cage, in/at the seals, or in/at the rolling element.

The sensor 2 comprises measurement means, at least a power source, communication means, a memory and processing means. In a particular embodiment, the sensor 2 is essentially flat, like a sensor tag, in order to limit encumbrance and avoid modifying the working of the component 5s or systems it is affixed to. More specifically, when affixed to a moving part, the sensor 2 must not alter the part physical characteristics, like weight, center of mass, adherence, . . . that could modify its movement.

The measurement means enable determining at least an operational parameter of the component 5. For determining the operation start-up time, the measurement means can be of a type chosen among Reed contact, magnetic flow meter or Hall sensor. The measurement means can also measure other relevant operational parameters of the component 5 like temperature, vibration, . . . .

The processing means and the power sources are both connected to the measurement means and to the communications means. Such an arrangement enables the sensor 2 to determine and record the operation stat-up time and to transmit the information along with the sensor identifier through the communication means to the central control unit 3.

The sensor 2 either comprises its own power source or draws power from an energy source in the product environment, preferably omnipresent energy (e.g. radio waves with different frequencies).

The energy supply of the sensor 2 can be emitted from sources as e.g. Bluetooth, WLAN or mobile phone base stations, RFID, Zigbee, or per radio waves via the central control unit 3.

The power source can be either omnipresent power harvesting means (radio waves, RFID, Bluetooth, WLAN), a battery, local energy harvesting means (piezoelectric, kinematic power source), electromagnetic power source or a combination thereof.

Omnipresent power harvesting means generates power when at least partially immerged in an energy field of predetermined properties. An example of omnipresent power harvesting means is an inductive power source generating power out of an electromagnetic field (i.e. Zigbee, Bluetooth, Wifi, Mobile Phone Network, . . . ).

Local energy harvesting means generates power by diverting a fraction of the energy of the component 5 the sensor is affixed to. It can be either directly fed power by tapping into the power of the component or system, or convert potential or mechanical energy of the component or system into electrical power (i.e. regenerative braking, potential energy conversion).

The processing means comprises an integrated clock, and are connected to the memory. The memory stores the sensor identifier, along with a predefined threshold value to be compared to at least one operational parameter measured by the measurement means in order to identify the operation start-up time.

In an embodiment, the processing means are configured to record an operation start-up time equal to the time stamp given by the integrated clock when the measurement received from the measurement means exceed the predefined threshold value.

The processing means command the communication means for periodically transmitting at least the operation start-up time along with the sensor identifier to the central control unit 3. The other operating parameters measured can also be periodically transmitted, either simultaneously with the transmission of the operation start-up time or within their own transmission along with the sensor identifier.

In another embodiment, the processing means command the communication means for periodically transmitting the at least one operational parameter measured along with the sensor identifier to the central control unit 3. The central control unit 3 comprises a memory, communication means and processing means like a processor or microcontroller.

In an embodiment, the central control unit 3 receives at least the sensor identifier along with the start-up time from at least a sensor 2 and connects to the remote server 4 for retrieving the pairing information linking each sensor identifier with a component identifier.

In another embodiment, central control unit 3 receives at least the sensor identifier along with the at least operational parameter. The central control unit processing means comprises an integrated clock and are configured to record an operation start-up time equal to the time stamp given by the integrated clock when the measurement received from the sensor exceed a predefined threshold value stored in memory.

In either embodiment, for each sensor 2, the central control unit 3 then records at least the start-up time transmitted by the sensor in a table linked to the component identifier. As described above, at least one operational parameter measured by the measurement means of the sensor 2 is recorded along with the component identifier within the table or a separate table on the same remote server 4 or on another server.

In a particular embodiment, the central control unit 3 determines at least one performance value depending of predetermined rules and of at least one of the values measured by at least a sensor 2. A performance value can be a Key Performance Index or KPI.

In some embodiments, the component and the at least one sensor are part of a machine comprising a housing. It is known that housing, and in particular, a metallic housing blocks all radio waves according to the Faraday effect. Consequently, such housings are commonly called Faraday cages. In order for communications from the sensor to reach out the central control unit, an antenna can be connected to the sensor through a bore in the housing. Alternatively, the antenna can be set as a repeater, repeating outside the housing the communications emitted by the sensor inside the housing.

In some other embodiments, the central control housing is also present within the housing. The communication between the sensor and the central control unit is unimpaired by the housing. However, the central control unit is similarly affected by the housing in its outgoing communications. Again, a bore in the housing allows fitting a physical connection or an antenna for outbound communications.

According to different embodiments, the component 5 fitted with a sensor 2 can be either a part of a system, a complete system, or a device comprising a plurality of systems.

As a consequence, a central control unit 3 accessing the remote server 4 can explicitly allocate one-to-one the identified individual components to records of sensor measurement, notably operating hours, operating temperatures, or other operation-relevant condition monitoring KPIs.

A product identifier for a part of a system, a complete system, or a device comprising a plurality of systems is defined based on the combination of at least two component identifiers, matching sensor identifiers and associated records of measurement. The product identifier along with operating start-up time or operating duration recorded by the sensors, is a technical enabler of performance-based business models.

In other words, it technically enables invoicing based on records of actual operating hours for a component 5 or invoicing for a product comprising a plurality of components, whom operating hours are being recorded by sensors. It also enables identifying the time of operation start-up, which is, among others, also important for warranty agreements and warranty claims.

In addition, by linking different components, it is possible to document servicing of a system and/or of its parts.

In a particular embodiment, the central control unit 3 provides an omnipresent energy field for powering each sensor 2 through their omnipresent power harvesting means.

The invention claimed is:

1. An operational parameter recording device comprising:
at least a sensor affixed to a component,
a central control unit having a central control unit processor, and
a remote server connected to the central control unit, wherein
each sensor comprises measurement means, at least a power source,
communication means, a memory and processing means, the measurement means being configured to determine at least an operational parameter, wherein
the memory comprises at least a sensor identifier, the processing means commanding the communication means for transmitting the sensor identifier to the central control unit, wherein
a start-up time of the component is either determined within the processing means and transmitted to the central control unit along with the sensor identifier or is determined within the central control unit processor, the start-up time determination being based on the at least an operational parameter and at least a predetermined threshold value for the at least an operational parameter, the central control unit memorizes, for each sensor identifier, the start-up time along with the sensor identifier in a data table, and wherein
the central control unit then determines an operating duration for the component as a function of the memorized start-up time for each sensor identifier and a pairing data recorded on the remote server linking the sensor identifier to a component identifier identifying the component the sensor is affixed to.

2. The operational parameter recording device according to claim 1, wherein the at least an operational parameter is transmitted to the central control unit along with the sensor identifier.

3. The operational parameter recording device according to claim 1, wherein the at least an operational parameter is chosen among position, speed, acceleration, angle, rotational speed, rotational acceleration, direction of rotation, elongation, temperature, presence of a chemical compound, resistance, current, voltage or magnetic field.

4. The operational parameter recording device according to claim 1, wherein the component is either a part of a system, a complete system, or a device comprising a plurality of systems.

5. The operational parameter recording device according to claim 1, wherein the component identifier and the sensor identifier are read and recorded as being paired on the remote server.

6. The operational parameter recording device according to claim 1, wherein the power source is omnipresent power harvesting means.

7. The operational parameter recording device according to claim 1, wherein the component is a bearing.

8. A bearing comprising:
an inner ring,
an outer ring,
at least one row of rolling elements,
at least one cage for maintaining a circumferential spacing of the rolling elements, the bearing further comprises the operational parameter recording device according to claim 1 and affixed to one of the inner ring and the outer ring, the at least one row of rolling elements or the at least one cage.

9. An operational parameter recording process for recording at least an operational parameter of a component through an operational parameter recording device, the operational parameter recording device comprising: at least a sensor affixed to the component, a central control unit having a central control unit processor, and a remote server connected to the central control unit, wherein each sensor comprises measurement means, at least a power source, communication means, a memory and processing means, the measurement means being configured to determine the at least an operational parameter, wherein the memory comprises at least a sensor identifier, the processing means commanding the communication means for transmitting the at least a sensor identifier to the central control unit, wherein a start-up time of the component is either determined within the sensor processing means and transmitted to the central control unit along with the at least a sensor identifier or is determined within the central control unit processor, the start-up time determination being based on at least one of the operational parameter and at least a predetermined threshold value for the at least an operational parameter, the central control unit memorizes, for each sensor identifier, the start-up time along with the sensor identifier in a data table, and wherein the central control unit then determines an operating duration for the component as a function of the memorized start-up time for each sensor identifier and a pairing data recorded on the remote server linking the sensor identifier to a component identifier identifying the component the sensor is affixed to, the operational parameter recording process comprising steps:

determining the at least an operational parameter,
determining the start-up time of the component based on the at least an operational parameter and the at least a predetermined threshold value for the at least an operational parameter,
memorizing the start-up time in the data table along with the sensor identifier stored within the memory of the sensor, for each sensor identifier, and
determining the operating duration for the component as the function of the memorized start-up time for each sensor identifier and the pairing data recorded on the remote server linking the sensor identifier to the component identifier identifying the component to which the sensor is affixed.

10. The operational parameter recording process according to claim 9, wherein the data pairing recorded on the remote server are determined by:
reading both the component identifier and the sensor identifier during manufacturing or servicing, and
recording both the component identifier and the sensor identifier as being paired on the remote server.

* * * * *